(12) United States Patent
Lan et al.

(10) Patent No.: US 12,166,377 B2
(45) Date of Patent: Dec. 10, 2024

(54) POWER SUPPLY PARALLEL CONTROL CIRCUIT, METHOD AND DEVICE

(71) Applicant: SHENZHEN WAYE TECHNOLOGY CO., LTD., Shenzhen (CN)

(72) Inventors: Bo Lan, Shenzhen (CN); Xinyan Liu, Shenzhen (CN)

(73) Assignee: SHENZHEN WAYE TECHNOLOGY CO., LTD., Shenzhen (CN)

( * ) Notice: Subject to any disclaimer, the term of this patent is extended or adjusted under 35 U.S.C. 154(b) by 21 days.

(21) Appl. No.: 17/903,268

(22) Filed: Sep. 6, 2022

(65) Prior Publication Data

US 2024/0006910 A1    Jan. 4, 2024

(30) Foreign Application Priority Data

Jun. 29, 2022 (CN) .......................... 202210750719.1

(51) Int. Cl.
*H02J 9/06* (2006.01)
(52) U.S. Cl.
CPC .................................. *H02J 9/061* (2013.01)
(58) Field of Classification Search
CPC .... H02J 9/06; H02J 9/061; H02J 9/062; H02J 1/10; H02J 1/086
See application file for complete search history.

(56) References Cited

U.S. PATENT DOCUMENTS

| | | | | |
|---|---|---|---|---|
| 5,786,685 | A | * | 7/1998 | Lange ........................ H02J 9/06 307/66 |
| 2010/0066431 | A1 | * | 3/2010 | Carter ..................... H02J 9/061 327/408 |
| 2014/0346878 | A1 | * | 11/2014 | Umeyama ............... G06F 1/263 307/52 |
| 2021/0359540 | A1 | * | 11/2021 | Pmsvvsv ................... H02J 1/10 |
| 2021/0367446 | A1 | * | 11/2021 | Askan ...................... H02H 7/22 |

* cited by examiner

*Primary Examiner* — Rexford N Barnie
*Assistant Examiner* — Rasem Mourad
(74) *Attorney, Agent, or Firm* — Westbridge IP LLC

(57) ABSTRACT

Disclosed are a power supply parallel control circuit, a method and a device. The circuit includes a power switching module, a first switch module, a second switch module, a third switch module and a fourth switch module all connected to the power switching module. The power switching module outputs a first switching signal according to a received switching control signal and control the second switch module to conduct unidirectionally. The first power supply continuously supplies power to a load and the third switch module is controlled to be on. The fourth switch module maintains unidirectional conduction and the second power supply starts to supply power to the load. The power switching module further outputs a second switching signal after a preset time to turn off the first switch module, the first power supply stops powering the load, and the fourth switch module is turned on.

4 Claims, 5 Drawing Sheets

S100  Outputting, by a power switching module, a first switching signal according to a received switching control signal, to control a second switch module of a first power supply to conduct unidirectionally and keep supplying power to a load, and to control a third switch module of the second power supply to turn on and keep a fourth switch module to unidirectionally conduct at this time to make the second power supply to start to power the load S200  Outputting, by a switching control module, a second switching signal, after a preset time, to control the first switch module of the first power supply to be turned off and stop the first power supply from supplying power to the load, and to control the fourth switch module of the second power supply to be turned on and make the second power supply to supply power to the load

FIG. 6

POWER SUPPLY PARALLEL CONTROL CIRCUIT, METHOD AND DEVICE

CROSS-REFERENCE TO RELATED APPLICATIONS

This application claims priority to Chinese Patent Application No. 202210750719.1, titled "POWER SUPPLY PARALLEL CONTROL CIRCUIT, METHOD AND DEVICE" and filed with the Chinese Patent Office on Jun. 29, 2022, which is incorporated herein by reference in its entirety.

TECHNICAL FIELD

This application relates to the technical field of power supply control, in particular to a power supply parallel control circuit, a power supply parallel control method and a power supply parallel control device.

BACKGROUND

At present, a control mode of parallel power supply in the market is: when a main power supply is powered down or has insufficient voltage, a standby power supply is switched to for supplying power, but the power supply will be lost for about 100 ms at the moment of switching. Therefore, the problem of how to realize zero-power-failure when switching power supply needs to be solved urgently.

SUMMARY

The main object of this application is to provide a power supply parallel control circuit, a power supply parallel control method and a power supply parallel control device, which aims to solve the technical problem of how to realize zero-power-fail switching during a power supply process of multiple power supplies powering a load.

In order to achieve the above objects, the following embodiments are provided by this application.

In one aspect, the present application provides a power supply parallel control circuit.

The power supply parallel control circuit comprises a power switching module, a first switch module connected to the power switching module, a second switch module connected to the power switching module, a third switch module connected to the power switching module and a fourth switch module connected to the power switching module, wherein the first switch module is further connected to a first power supply, and the second switch module is further connected to the first switch module and a load respectively, the third switch module is further connected to a second power supply, and the fourth switch module is further connected to the third switch module and the load;

wherein the power switching module is configured to output a first switching signal according to a received switching control signal, to control the second switch module to conduct unidirectionally and make the first power supply continuously supply power to the load, and to control the third switch module to be turned on, at this time, the fourth switch module is remained to be unidirectionally conductive, and the second power supply is started to supply power to the load; and the power switching module is further configured to output a second switching signal after a preset time, to control the first switch module to be turned off and stop the first power supply from supplying power to the load, and control the fourth switch module to be turned on to make the second power supply supply power to the load.

Optionally, the power supply parallel control circuit further comprises:

a switching control module connected to the power switching module, and configured to generate the switching control signal according to any one of a working temperature of the first power supply, an output voltage of the first power supply, a manual switching operation and a preset period, and output the switching control signal.

Optionally, the power switching module comprises:

a micro-control unit configured to output the first switching signal according to the switching control signal, and output a second switching signal after the preset time;

a first driving unit connected with the micro-control unit, the first switch module and the second switch module, and configured to control the second switch module to conduct unidirectionally according to the first switching signal, and control the first switch module to be turned off according to the second switching signal; and a second driving unit connected to the micro-control unit, the third switch module and the fourth switch module, and configured to control the third switch module to be turned on according to the first switching signal, and control the fourth switch module to be turned on according to the second switching signal.

Optionally, the first driving unit comprises:

a first driving circuit, wherein an input terminal of the first driving circuit is connected to the micro-control unit, and an output terminal of the first driving circuit is connected to the first switch module, and the first driving circuit is configured to control the first switch module to be turned off according to the second switching signal; and a second driving circuit, wherein an input terminal of the second driving circuit is connected to the micro-control unit, and an output terminal of the second driving circuit is connected to the second switch module, and the second driving circuit is configured to control the second switch module to conduct unidirectionally according to the first switching signal.

Optionally, the first driving circuit and the second driving circuit include any one of an optocoupler, a driver, a field effect transistor or a triode.

Optionally, the first driving circuit comprises an optocoupler U1;

wherein a first pin of the photocoupler U1 is connected to the micro-control unit through a resistor R1, a second pin of the photocoupler U1 is grounded, a third pin of the photocoupler U1 is connected to an anode of a diode D1, and a fourth pin of the photocoupler U1 is connected to the first power supply, and wherein a cathode of the diode D1 is connected to the first switch module through a resistor R3.

Optionally, the first switch module comprises a first switch element, and the second switch module comprises a second switch element and a diode connected in parallel;

wherein a terminal of the first switch element is connected to a positive electrode of the first power supply, another terminal of the first switch element is connected to a terminal of the second switch element and an anode of the diode, another terminal of the second switch element and a cathode of the diode are connected to a positive electrode of the load; or a terminal of the first switch element is connected to a negative electrode of the first power supply, another terminal of the first switch element is connected to a terminal of the second switch element and a cathode of the diode, and another terminal of the second switch element and an anode of the diode are connected to a negative electrode of the load.

Optionally, the first switch module comprises a field effect transistor Q1, and the second switch module comprises a field effect transistor Q2;

wherein a gate of the field effect transistor Q1 is connected to the first driving circuit, and a source of the field effect transistor Q1 is connected to a negative electrode of the first power supply, to the gate of the field effect transistor Q1 and to an anode of a Zener diode D3 through a resistor R5, wherein a negative electrode of the Zener diode D3 is connected to the gate of the field effect transistor Q1, and wherein a drain of the field effect transistor Q1 is connected to the source of the field effect transistor Q1 through a capacitor C1, and the drain of the field effect transistor Q1 is further connected to the second switch module; and a gate of the field effect transistor Q2 is connected to the second driving circuit, a source of the field effect transistor Q2 is connected to a negative electrode of the load, and the source is further connected to the gate of the field effect transistor Q2 through a resistor R6 and further to an anode of a zener diode D4, and wherein a cathode of the zener diode D4 is connected to the gate of the field effect transistor Q2, a positive electrode of the load is connected to a positive electrode of the first power supply, a drain of the field effect transistor Q2 is connected to the source of the field effect transistor Q2 through a capacitor C2, and the drain of the field effect transistor Q2 is further connected to the drain of the field effect transistor Q1.

For a second aspect, this application provides a power parallel control method comprising:

outputting, by a power switching module, a first switching signal according to a received switching control signal, to control a second switch module of a first power supply to conduct unidirectionally and make the first power supply continuously supply power to the load, and to control a third switch module of a second power supply to be turned on, wherein a fourth switch module is turned on in one direction, and the second power supply is started to power the load; and outputting, by a switching control module, a second switching signal after a preset time, to control the first switch module of the first power supply to be turned off and stop the first power supply from supplying power to the load, and to control the fourth switch module of the second power supply to be turned on and make the second power supply to supply power to the load.

For the third aspect, this application provides a power parallel control device, including:

at least two sets of power supply;

the power supply parallel control circuit described above, wherein the power supply parallel control circuit is connected to the at least two sets of power supply.

This application provides a power supply parallel control circuit, a power supply parallel control method and a power supply parallel control device. The power switching module outputs a first switching signal according to the received switching control signal to control the second switch module of the first power supply to conduct in one direction. The first switch module remains on, the first power supply continues to supply power to the load, and the third switch module of the second power supply is controlled to conduct. At this time, the fourth switch module remains on in one direction, and the second power supply starts to supply power to the load. Then after a preset time, the second switching signal is output, and the first switch module of the first power supply is controlled to be turned off, therefore, the first power supply stops supplying power to the load, and the fourth switch module of the second power supply is controlled to be turned on. At this time, the third switch module and the fourth switch module are both turned on, and the second power supply supplies power to the load. In the process of switching from the first power supply to the second power supply, the power supply of the load is maintained by controlling the states of the two switch modules in the power supply, which realizes the zero-power-failure switching of the power supply, solves the technical problem of how to realize the zero-power-fail switching of the power supply when multiple power sources supply power to the load, and improves the efficiency of power switching.

BRIEF DESCRIPTION OF THE DRAWINGS

In order to more clearly describe the technical solutions in the embodiments of this application or in the prior art, the accompanying drawings required to be used in the description of the embodiments or the related art will be briefly described below. Obviously, the accompanying drawings in the following description are only some embodiments of this application.

FIG. 6 is a flow diagram of S100 and S200 of this application.

Figure 1:
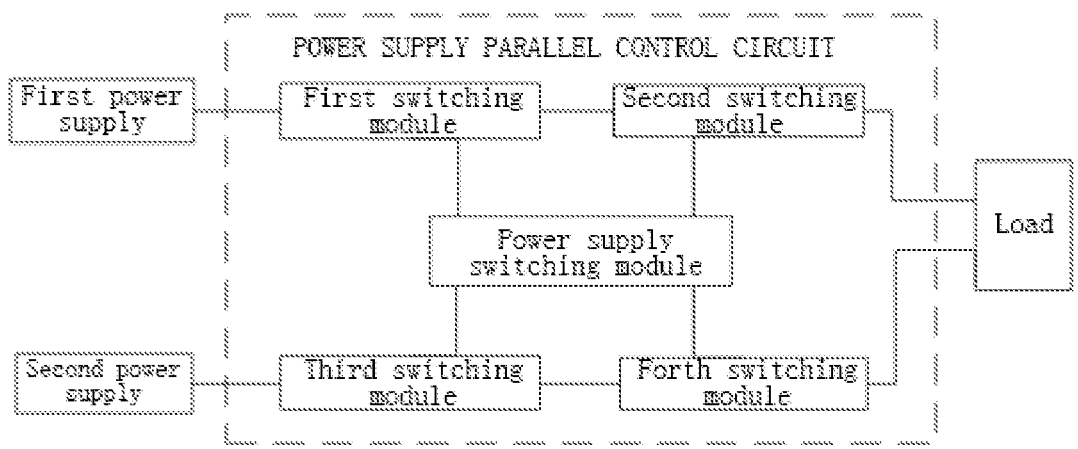
FIG. 1 is a schematic structural diagram of a power supply parallel control circuit according to an embodiment of this application.

The realization of the object, functional features and advantages of this application will be further described in combination with the embodiments and with reference to the accompanying drawings.

DETAILED DESCRIPTION OF THE EMBODIMENTS

In order to make the objectives, technical solutions and advantages of this application clearer, the technical solutions in the embodiments of this application will be clearly and completely described below with reference to the accompanying drawings in the embodiments of this application. Obviously, the described embodiments are only a part of the embodiments of this application, not all of the embodiments. Based on the embodiments in this application, all other embodiments obtained by ordinary skills in the art without making creative labor belongs to the scope of protection of this application.

It should be understood that the specific embodiments described herein are only used to explain this application and are not used to limit this application.

In this application, the terms "comprising", "including" or any other variant thereof are intended to cover non-exclusive inclusion such that a device or method including a series of elements includes not only those elements, but also other elements not explicitly listed, or also elements inherent in such a device or method. Without further limitation, the element defined by the statement "including a . . . " does not preclude existence of another identical element in the device or method that includes the element.

In addition, in this application, unless otherwise expressly specified and limited, the terms "connection", "fixed", etc. should be understood in a broad sense. For example, "connection" can be a fixed connection, a detachable connection, or a whole. "Connection" can be a mechanical connection or an electrical connection. "Connection" can be a direct connection or an indirect connection through an intermediate medium. "Connection" can be the internal communication of the two elements or the interaction relationship between the two elements, unless otherwise clearly defined. For those of ordinary skill in the art, the specific meaning of the above terms in this application can be understood according to specific circumstances. If there is a description relating to "first", "second" and the like in the embodiments of this application, the description of "first", "second" and the like is only used for the purpose of description and cannot be understood as indicating or implying the relative importance thereof or implicitly indicating the number of technical features indicated. Thus, the feature defining "first" and "second" may explicitly or implicitly include at least one of the features.

In this application, suffixes such as "module", "component" or "unit" for representing elements are used only for the purpose of facilitating the description of this application, which is of no particular significance. Thus, "modules", "components", or "units" may be used in a mixed manner. For those of ordinary skill in the art, the specific meaning of the above terms in this application can be understood according to specific circumstances. In addition, the technical solutions of the various embodiments may be combined with each other, but they must be based on those of ordinary skill in the art. When the combination of the technical solutions is contradictory or cannot be realized, it should be considered that the combination of the technical solutions does not exist and is not within the scope of protection required by this application.

In view of the technical problem of how to achieve zero-power-failure switching in a process of multi-power supply to a load in the related art, this application provides a power supply parallel control circuit, method and device. The overall solution is as follows.

The power supply parallel control circuit includes a power switching module, a first switch module, a second switch module, a third switch module and a fourth switch module all connected to a power switching module, the first switch module is further connected to a first power supply, the second switch module is further connected to the first switch module and a load, the third switch module is further connected to a second power supply, and the fourth switch module is further connected to the third switch module and the load, the power switching module is configured to output a first switching signal according to a received switching control signal and control the second switch module to conduct in one direction, so that the first power supply continuously supplies power to the load and controls the third switch module to conduct. At this time, the fourth switch module maintains one-way conduction, so that the second power supply starts to supply power to the load. The power switching module is also configured to output a second switching signal after a preset time to turn off the first switch module to stop power supplying of the first power supply to the load, and to turn on the fourth switch module to enable power supplying of the second power supply to the load.

This application provides a power supply parallel control circuit, a power supply parallel control method and a power supply parallel control device. The power switching module outputs a first switching signal according to the received switching control signal to control the second switch module of the first power supply to conduct in one direction. The first switch module remains on, the first power supply continues to supply power to the load, and the third switch module of the second power supply is controlled to conduct. At this time, the fourth switch module remains on in one direction, and the second power supply starts to supply power to the load. Then after a preset time, the second switching signal is output, and the first switch module of the first power supply is controlled to be turned off, therefore, the first power supply stops supplying power to the load, and the fourth switch module of the second power supply is controlled to be turned on. At this time, the third switch module and the fourth switch module are both turned on, and the second power supply supplies power to the load. In the process of switching from the first power supply to the second power supply, the power supply of the load is maintained by controlling the states of the two switch modules in the power supply, which realizes the zero-power-failure switching of the power supply, solves the technical problem of how to realize the zero-power-fail switching of the power supply when multiple power sources supply power to the load, and improves the efficiency of power switching. Furthermore, in the process of switching from the first power supply to the second power supply, when the first power supply and the second power supply both supply power to the load, due to the unidirectional conduction states of the second switch module and the fourth switch module, currents of the first power supply and the second power supply do not flow to each other, thus solving the technical problem of currents of multiple power supply flowing to each other during power supply switching.

The power supply parallel control circuit, the power supply parallel control method and the power supply parallel control device applied in the technical implementation of this application are described in detail below in conjunction with the drawings and the embodiments:

First Embodiment

Figure 2:
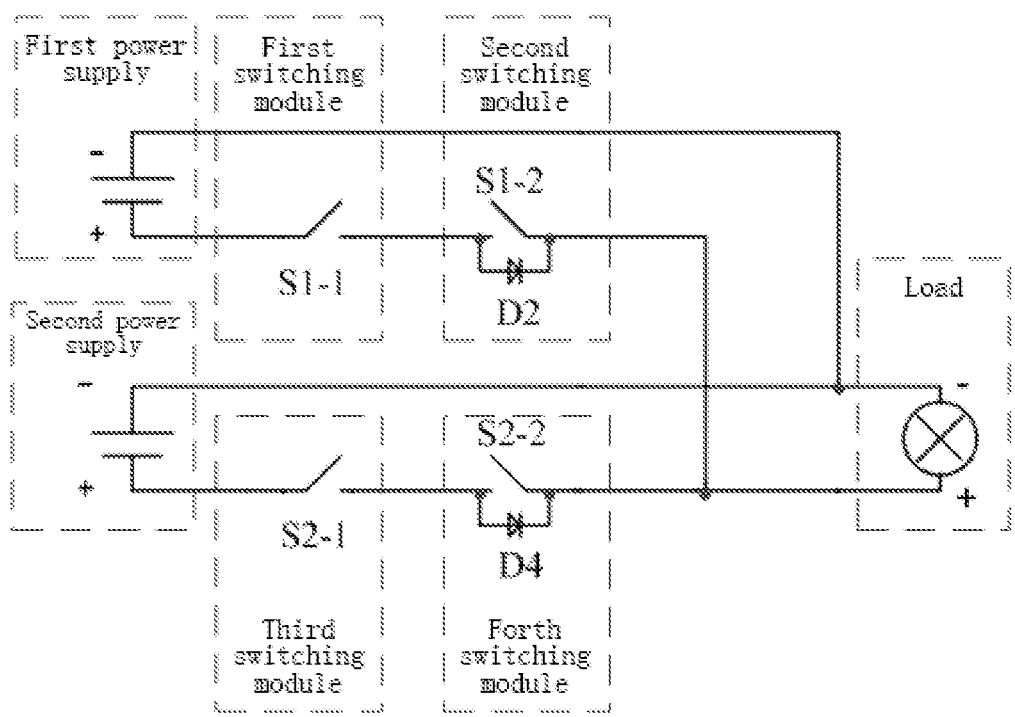
FIG. 2 is a partial schematic circuit diagram of an embodiment of the power supply parallel control circuit of this application.
Figure 3:
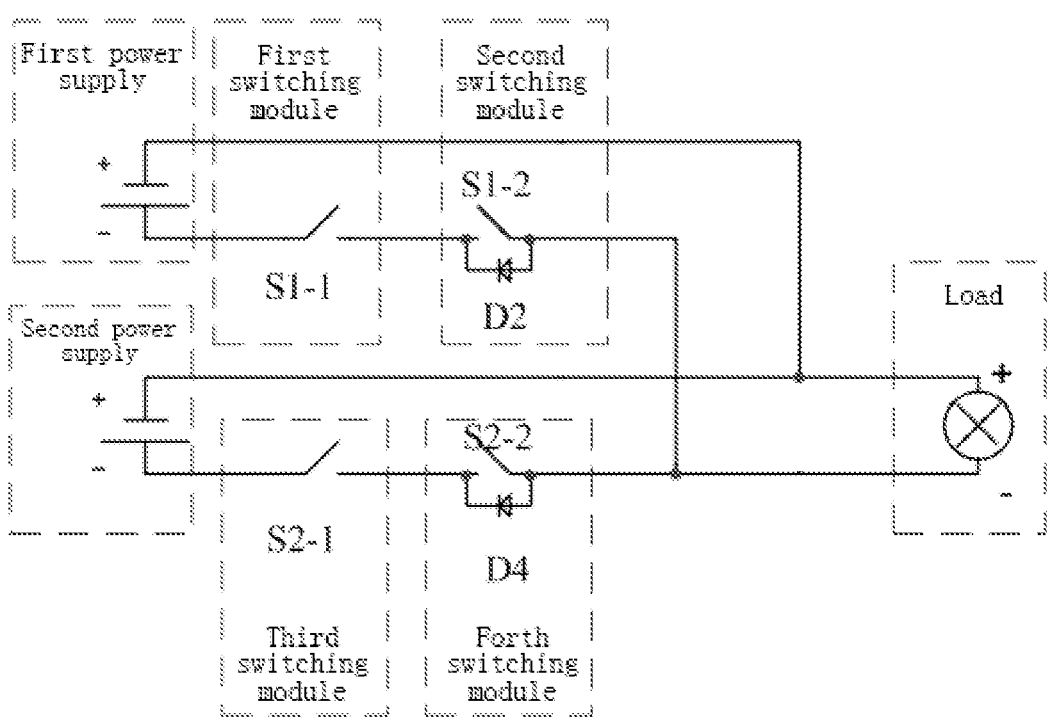
FIG. 3 is a partial schematic circuit diagram of another embodiment of the power supply parallel control circuit of this application.
Figure 4:
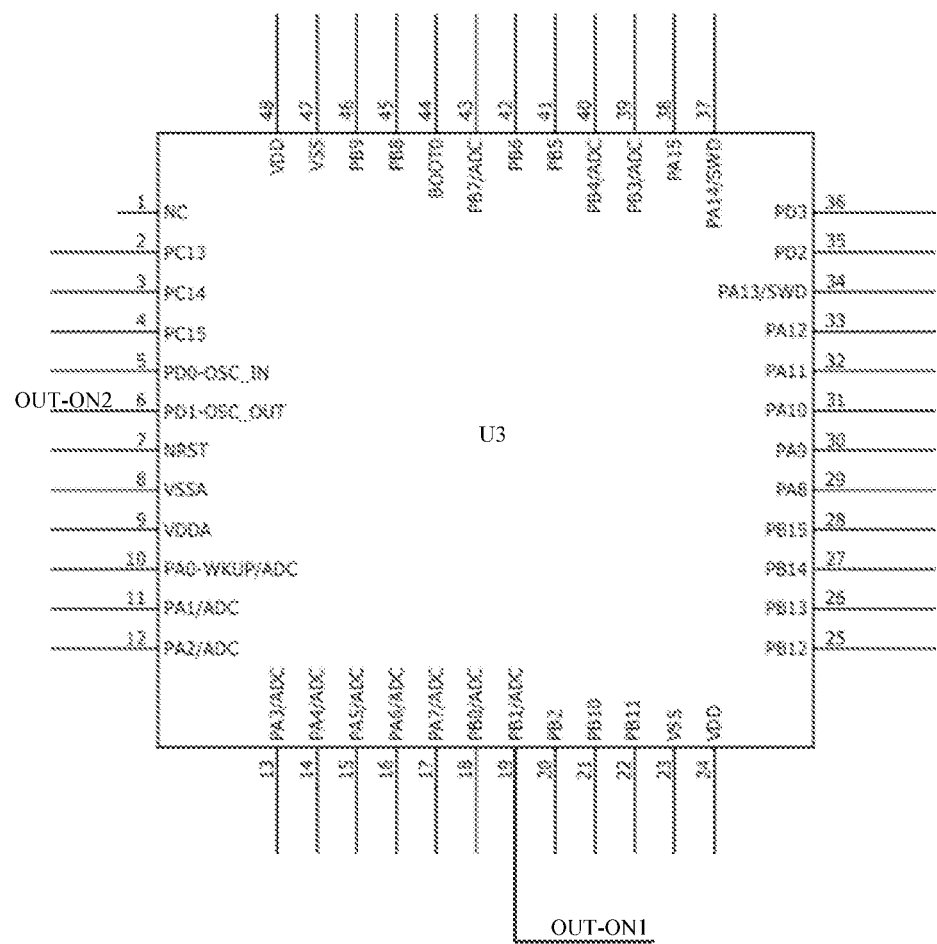
FIG. 4 is a schematic circuit diagram of a micro-control unit of the power supply parallel control circuit according to an embodiment of this application.
Figure 5:
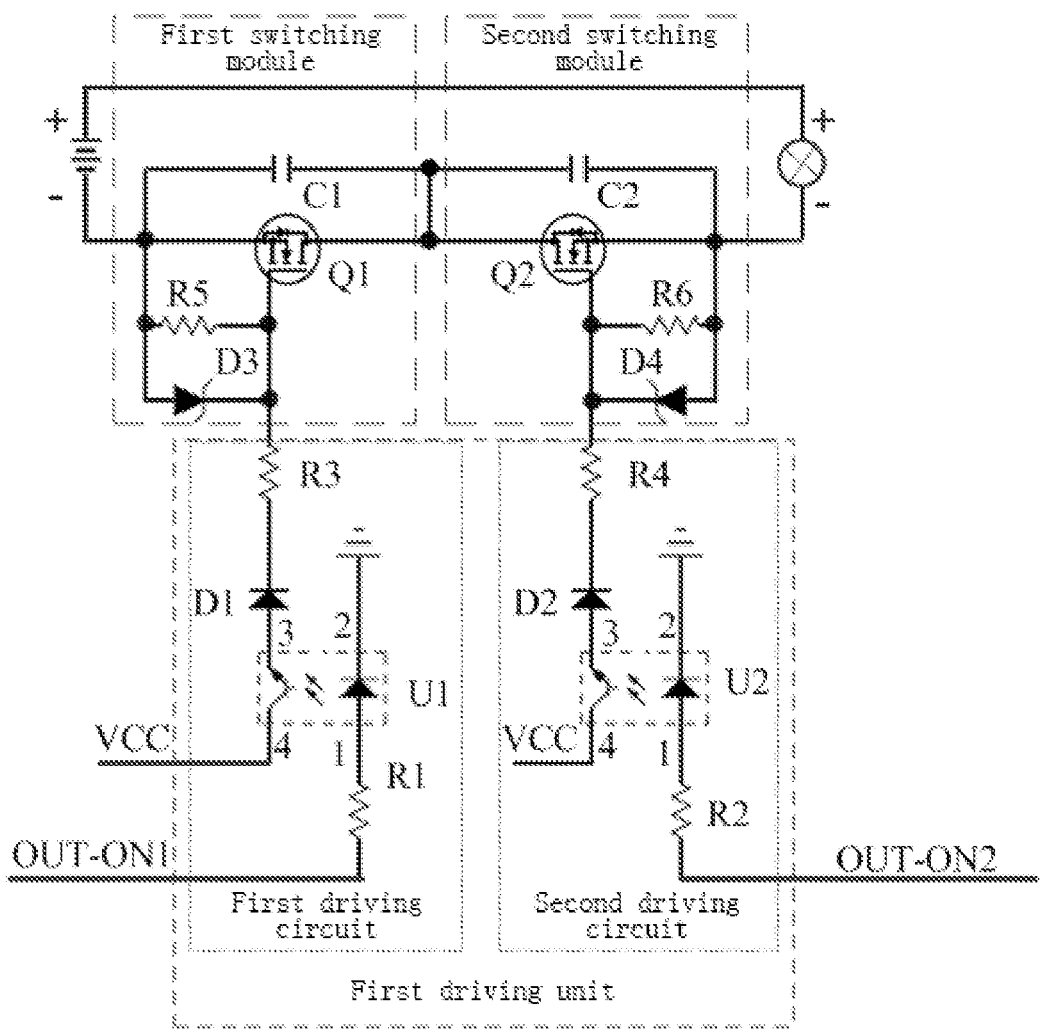
FIG. 5 is a partial schematic circuit diagram of still another embodiment of a power supply parallel control circuit according to this application.

According to FIGS. 1 to 5, FIG. 1 is a schematic structural diagram of a power parallel control circuit according to an embodiment of this application, FIG. 2 is a partial circuit schematic diagram of an embodiment of the power parallel control circuit according to an embodiment of this application, FIG. 3 is a partial circuit schematic diagram of another embodiment of the power parallel control circuit according to an embodiment of this application, FIG. 4 is a schematic circuit diagram of a micro-control unit of the first embodiment of the power parallel control circuit of this application, FIG. 5 is a partial schematic circuit diagram of still another embodiment of the power parallel control circuit of this application. This application provides a power parallel control circuit. The power parallel control circuit includes a power switching module, a first switch module, a second switch module, a third switch module and a fourth switch module all connected to the power switching module, the first switch module is further connected to a first power supply, and the second switch module is further connected to the first switch module and the load, the third switch module is further connected to a second power supply, and the fourth switch module is further connected to the third switch module and the load.

The power switching module is configured to output a first switching signal according to a received switching control signal, and control the second switch module to conduct on one direction, so that the first power supply keeps supplying power to the load, and control the third switch module to conduct. At this time, the fourth switch module is kept turned on in one direction, so that the second power supply starts to supply power to the load.

The power switching module is further configured to output a second switching signal after a preset time, to turn off the first switch module and stop the first power supply from supplying power to the load, and to turn on the fourth switch module and make the second power supply to supply power to the load.

The power supply parallel control circuit further includes: a switching control module connected to the power switching module, and configured to generate the switching control signal according to any one of a temperature of the first power supply, a voltage of the first power supply, a manual switching operation or a preset cycle, and output the switching control signal.

In this embodiment, the switching control module includes any one of a temperature detection circuit, a voltage detection circuit, a manual switching circuit and an automatic switching circuit. The temperature detection circuit can detect a working temperature of the first power supply. When the working temperature of the first power supply exceeds a preset temperature threshold, the switching control signal is output to control the power switching module to switch the power supply of the load from the first power supply to the second power supply. The voltage detection circuit can detect an output voltage of the first power supply. When the output voltage of the first power supply is lower than a preset voltage threshold, a switching control signal is output to control the power switching module to switch the power supply of the load from the first power supply to the second power supply. The temperature detection circuit or the voltage detection circuit detects the working temperature or the output voltage of the power supply that is supplying power to the load, and is not limited to the first power supply. When the working temperature of the power supply that is supplying power exceeds a preset temperature threshold or the output voltage of the power supply that is supplying power is less than a preset voltage threshold, another power supply is needed to be connected for supplying power to the load, and the temperature detection circuit or the voltage detection circuit outputs the switching control signal. In addition, the manual switching circuit can output the switching control signal according to the user's manual switching operation, and control the power switching module to switch the power supply of the load from the first power supply to the second power supply, and the manual switching operation can be an operation made by the user who determines that the switching of the power supply of the load from the first power supply to the second power supply or from the second power supply to the first power supply is needed according to an actual need. The automatic switching circuit can generate the switching control signal according to a preset period, which can be set according to the power of the power supply.

In addition, the preset time can be set according to types of the first switch module, the second switch module, the third switch module and the fourth switch module. In this embodiment, the preset time is set to be 500 ms.

In an implementation, when the first power supply supplies power to the load, firstly, the power switching module outputs the first switching signal according to the received switching control signal to control the second switch module of the first power supply to conduct in one direction to make the first power supply continuously supply power to the load and control the third switch module of the second power supply to conduct in one direction, at this time, the fourth switch module is kept to be conduct in one direction, so that the second power supply starts to power the load. After a preset time, the power switching module outputs the second switching signal to turn off the first switch module of the first power supply and stop the first power supply from supplying power to the load, and turn on the fourth switch module of the second power supply. The third switch module and the fourth switch module of the second power supply are both turned on, and the second power supply starts to supply power to the load.

As an option of this embodiment, the power switching module includes:
  a micro-control unit configured to output the first switching signal according to the switching control signal, and output the second switching signal after the preset time;
  a first driving unit connected with the micro-control unit, the first switch module and the second switch module, and configured to control the second switch module to conduct unidirectionally according to the first switching signal, and control the first switch module to be turned off according to the second switching signal; and
  a second driving unit connected with the micro-control unit, the third switch module and the fourth switch module, and configured to control the third switch module to be turned on according to the first switching signal, and control the fourth switch module to be turned on according to the second switching signal.

In this embodiment, the micro-control unit may be a micro controller such as a single-chip micro computer, according to FIG. 3, in this embodiment, a single-chip micro computer U3 with a model of LQF48 (Low-profile Quad Flat Package) may be selected, the first switching signal OUT-ON2 and the second switching signal OUT-ON1 are respectively output by two pins of the single-chip microcomputer U3. After receiving the switching control signal, the single-chip microcomputer U3 first outputs the first switching signal OUT_ON2, and then outputs the second switching signal OUT-ON1 after the preset time. The first driving unit is configured to control the second switch module and the first switch module of the first power supply according to the first switching signal OUT-ON2 and the second switching signal OUT-ON1 respectively, and the second driving unit is configured to control the third switch module and the fourth switch module of the second power supply according to the first switching signal OUT-ON2 and the second switching signal OUT-ON1 respectively. A structure of the first driving unit and a structure of the second driving unit can be the same or different. This embodiment takes the first driving unit and the second driving unit having the same structure for detailed description.

In this embodiment, when the first power supply supplies power to the load, firstly, the micro-control unit outputs the first switching signal according to the received switching control signal, and controls the first driving unit to drive the second switch module of the first power supply to conduct unidirectionally. At this time, the first power supply continuously supplies power to the load, and the micro-control unit controls the second driving unit to drive the third switch module of the second power supply to conduct. At this time, the fourth switch module maintains unidirectional conduction, so as to make the second power supply start to supply power to the load. Then, the micro-control unit outputs the second switching signal after the preset time, and controls the first driving unit to drive the first switch module of the first power supply to be turned off. At this time, the first power supply stops supplying power to the load, and the micro-control unit controls the second driving unit to drive the fourth switch module of the second power supply to be turned on. At this time, the third switch module and the fourth switch module of the second power supply are both turned on, and the second power supply starts to supply power to the load.

The first driving unit includes:
a first driving circuit, where an input end of the first driving circuit is connected with the micro-control unit, and an output end of the first driving circuit is connected with the first switch module, and the first driving circuit is configured to control the first switch module to be turned off according to the second switching signal; and
a second driving circuit, where an input terminal of the second driving circuit is connected to the micro-control unit, and an output terminal of the second driving circuit is connected to the second switch module, and the second driving circuit is configured to control the second switch module to conduct unidirectionally according to the first switching signal.

In this embodiment, the first driving circuit and the second driving circuit are configured for controlling the first switch module and the second switch module of the first power supply respectively. Circuit structures of the first driving circuit and the second driving circuit may be the same or different. This embodiment takes the first driving circuit and the second driving circuit having the same circuit structure for detailed description.

It can be understood that in this embodiment, the second driving unit includes:
a third driving circuit, where an input terminal of the third driving circuit is connected with the micro-control unit, and an output terminal of the third driving circuit is connected with the third switch module, and the third driving circuit is configured to control the third switch module to turn on according to the first switching signal; and
a fourth driving circuit, where an input terminal of the fourth driving circuit is connected to the micro-control unit, and an output terminal of the fourth driving circuit is connected to the fourth switch module, and the fourth driving circuit is configured to control the fourth switch module to be turned on according to the second switching signal.

In this embodiment, when the first power supply supplies power to the load, the micro-control unit outputs the first switching signal according to the received switching control signal, and controls the first driving circuit to drive the second switch module of the first power supply to conduct unidirectionally. At this time, the first power supply continuously supplies power to the load, and the micro-control unit controls the third driving circuit to drive the third switch module of the second power supply to conduct. At this time, the fourth switch module maintains unidirectional conduction, so as to make the second power supply start to supply power to the load. Then, after the preset time, the micro-control unit outputs a second switching signal to control the second driving circuit to turn off the first switch module of the first power supply and stop the first power supply from supplying power to the load, and control the fourth driving circuit to turn on the fourth switch module of the second power supply. At this time, the third switch module and the fourth switch module of the second power supply are both turned on, and the load is supplied with power from the second power supply.

The first driving circuit and the second driving circuit each include any one of a photocoupler, a driver, a field effect transistor and a triode.

According to FIG. 5, the first driving circuit includes a photocoupler U1.

A first pin 1 of the photocoupler U1 is connected to the micro-control unit through a resistor R1, a second pin 2 of the photocoupler U1 is grounded, a third pin 3 of the photocoupler U1 is connected to an anode of a diode D1, a fourth pin 4 of the photocoupler U1 is connected to the first power supply, and a cathode of the diode D1 is connected to the first switch module through a resistor R3.

In this embodiment, the photocoupler is an electro-optical-electro conversion device that transmits electrical signals with light as a medium, the photocoupler is composed of two parts: a light-emitting source and a light receiver. The light-emitting source and the light receiver are assembled in a same closed shell, and isolated by a transparent insulator. A pin of the light-emitting source is an input terminal, a pin of the light receiver is an output terminal. A common light-emitting source is the light-emitting diode, and a common light receiver is the photodiode, the phototransistor, or the like. A model of the photocoupler U1 is selected according to actual needs. In this embodiment, the photocoupler U1 with a model of PC817C is selected. The first power supply not only provides a power supply voltage for the load, but also provides a driving voltage VCC for the photocoupler U1. A voltage value of the driving voltage VCC is set according to actual requirements.

It can be understood that, in this embodiment, the second driving circuit, the third driving circuit and the fourth driving circuit each has a circuit structure same as the first driving circuit. According to FIG. 2, the second driving circuit includes a photocoupler U2. A first pin 1 of the photocoupler U2 is connected to the micro-control unit through a resistor R2, a second pin 2 of the photocoupler U2 is grounded, the third pin 3 of the photocoupler U2 is connected to an anode of the diode D2, and a fourth pin 4 of the photocoupler U2 is connected to the first power supply, a cathode of the diode D2 is connected to the second switch module through a resistor R4. The structure of the third driving circuit is the same as that of the first driving circuit, and the structure of the fourth driving circuit is the same as the structure of the second driving circuit. For the sake of simplicity of the application, details are not repeated here.

In this embodiment, when the first power supply supplies power to the load, the micro-control unit outputs the first switching signal OUT-ON2 according to the received switching control signal, controls the optocoupler U2 to be turned off to disconnect the driving voltage VCC from the second switch module, so that the second switch module of the first power supply is unidirectionally turned on. At this time, the first power supply continuously supplies power to the load and the micro-control unit controls the third driving circuit to be turned on to connect the driving voltage VCC to the third switch module of the second power supply, and turn on the third switch module of the second power supply. At this time, the second power supply starts to supply power to the load. Then, after the preset time, the micro-control unit outputs the second switching signal OUT-ON1, controls the optocoupler U1 to be turned off to disconnect the driving voltage VCC from the first switch module of the first power supply, so that the first switch module of the first power supply is turned off. At this time, the first power supply stops supplying power to the load, and the micro-control unit controls the fourth driving circuit to be turned on, the driving voltage VCC is connected to the fourth switch module of the second power supply, and the fourth switch module of the second power supply is turned on. At this time, the third switch module and the fourth switch module of the second power supply are both turned on, and the second power supply is connected to the load to supply power to the load.

According to FIGS. 2 and 3, the first switch module includes a first switch element S1-1, and the second switch module includes a second switch element S2-1 and a diode D2 connected in parallel.

One terminal of the first switch element S1-1 is connected to a positive electrode of the first power supply, the other terminal of the first switch element S1-1 is connected to one terminal of the second switch element S2-1 and the anode of the diode D2, and the other terminal of the second switch element S2-1 and the cathode of the diode D2 are connected to a positive electrode of the load.

Alternatively, one terminal of the first switch element S1-1 is connected to a negative electrode of the first power supply, the other terminal of the first switch element S1-1 is connected to one terminal of the second switch element S2-1 and the cathode of the diode D2, and the other terminal of the second switch element S2-1 and the anode of the diode D2 are connected to a negative electrode of the load.

In this embodiment, the first switch element and the second switch element may include a semiconductor switch or a relay switch, and the semiconductor switch includes a triode, a thyristor, an insulated gate bipolar transistor, or the like. According to FIGS. 2 and 3, the third switch module includes a third switch element S1-2, and the fourth switch module includes a fourth switch element S2-2 and a diode D4 connected in parallel. One terminal of the third switch element S1-2 is connected to a positive electrode of the second power supply, and the other terminal of the third switch element S1-2 is connected to one terminal of the fourth switch element S2-2 and the anode of the diode D4, the other terminal of the fourth switch element S2-2 and the cathode of the diode D4 are connected to the positive electrode of the load. Alternatively, one terminal of the third switch element S1-2 is connected to a negative electrode of the second power supply, the other terminal of the third switch element S1-2 is connected to one terminal of the fourth switch element S2-2 and the cathode of the diode D2, and the other terminal of the fourth switch element S2-2 and the anode of the diode D4 are connected to the negative electrode of the load.

In this embodiment, when the first power supply supplies power to the load, the switch of the first switch module and the switch of the second switch module are both turned on. The power switching module outputs the first switching signal according to the received switching control signal to control the switch of the second switch module of the first power supply to turn off. At this time, the first power supply continuously supplies power to the load through the first switch module and the diode of the second switch module. The power switching module controls the switch of the third switch module of the second power supply to turn off. At this time, the second power supply starts to power the load through the third switch module and the diode of the fourth switch module. Due to the unidirectional conduction characteristic of the diode, a current of the first power supply does not flow to the second power supply, and a current of the second power supply does not flow to the first power supply. Then, the power switching module outputs the second switching signal after the preset time, the switch of the first switch module of the first power supply is controlled to be turned off, and the switch of the fourth switch module of the second power supply is controlled to be turned on. At this time, the diode in the first switch module of the first power supply causes the first power supply to stop supplying power to the load, the switch of the third switch module and the switch of the fourth switch module of the second power supply are controlled to be turned on, and the second power supply supplies power to the load.

This embodiment provides a power supply parallel control circuit. The power supply parallel control circuit outputs a first switching signal through a power switching module according to a received switching control signal, and controls a switch of a second switch module of a first power supply to be turned off. At this time, the first power supply continuously supplies power to a load through the first switch module and a diode of the second switch module, and the power supply parallel control circuit controls a switch of a third switch module of a second power supply to be turned off, at this time, the second power supply start to supply power to the load through the third switch module and a diode of the fourth switch module. Then, after a preset time, the power switching module outputs the second switching signal to control the switch of the first switch module of the first power supply to be turned off. At this time, the first switch module is turned off, so that the first power supply stops supplying power to the load. The power switching module controls the switch of the fourth switch module of the second power supply to be turned off, at this time, the third switch module and the fourth switch module are both turned on, and the second power supply supplies power to the load. During a process of switching the power supply of the load from the first power supply to the second power supply, by separately controlling the states of the two switch modules in the power supply, the power supply is maintained and no power fail happens, which realizes a zero-power-fail switching of the power supply, and solves the technical problem of how to realize the zero-power-failure switching in the process of multiple power supply powering the load. Furthermore, in the process of switching from the first power supply to the second power supply, when the first power supply and the second power supply both supply power, due to the unidirectional conduction characteristics of the diode in the second switch module and the diode in the fourth switch module, the currents of the first power supply and the second power supply do not flow to each other, thus solving the technical problem that currents of multiple power supplies flow to each other during power supply switching.

Second Embodiment

Further, according to FIG. 5, FIG. 5 is a portion of the schematic circuit diagram of the second embodiment of the power supply parallel control circuit of this application. This embodiment provides a power supply parallel control circuit, a first switch module includes a field effect tube Q1, and a second switch module includes a field effect tube Q2.

The field effect tube Q1 includes:
a gate connected to a first driving circuit;
a source connected to a negative electrode of a first power supply, to the gate of field effect tube Q1 through a resistor R5 and further to an anode of a Zener diode D3; and
a drain connected to the source of the field effect tube Q1 through a capacitor C1 and to a second switch module.

A cathode of the Zener diode D3 is connected to the gate of field effect tube Q1.

The field effect tube Q2 includes:
a gate connected to a second driving circuit;
a source connected to a negative electrode of a load, to the gate of the field effect tube Q2 through a resistor R6, and further to an anode of a Zener diode D4; and
a drain connected to the source of the field effect tube Q2 through a capacitor C2, and further to the drain of the field effect tube Q1.

A cathode of the Zener diode D4 is connected to the gate of the field effect tube Q2, and a positive electrode of the load is connected to a positive electrode of the first power supply.

In this embodiment, the first switch module and the second switch module are connected to the negative electrode of the first power supply and the negative electrode of the load respectively, and the third switch module and the fourth switch module are connected to the negative electrode of the second power supply and the negative electrode of the load respectively. A driving voltage VCC may be 12V. A structure of the third switch module can be the same as a structure of the first switch module, and a structure of the fourth switch module can be the same as a structure of the second switch module. For the sake of simplicity of the application, details are not repeated here.

In this embodiment, when the first power supply supplies power to the load, a micro-control unit outputs a first switching signal OUT-ON2 according to a received switching control signal, controls a photoelectric coupler U2 to be turned off and disconnect the 12V driving voltage VCC from the field effect transistor Q2, thus the field effect transistor Q2 of the first power supply is turned off. At this time, the first power supply continuously supplies power to the load through the field effect transistor Q1 and the diode of the field effect transistor Q2. The micro-control unit controls the photoelectric coupler of the third driving circuit to be turned on and connect the driving voltage VCC to the third switch module of the second power supply to turn on the third switch module of the second power supply. At this time, the fourth switch module of the second power supply is turned off, so that the second power supply and the load are kept disconnected from each other. Then, after a preset time, the micro-control unit outputs a second switching signal OUT-ON1, controls a photoelectric coupler U1 to be turned off and disconnect the 12V driving voltage VCC from the field effect transistor Q1 of the first power supply. The field effect transistor Q1 of the first power supply is turned off. At this time, both the field effect transistor Q1 and the field effect transistor Q2 are turned off, thus the first power supply is disconnected from the load and stops supplying power to the load. The photoelectric coupler of the fourth driving circuit is controlled to be turned on, the driving voltage VCC is connected to the fourth switch module of the second power supply, and the field effect transistor of the fourth switch module is turned on, thus the load is powered by the second power supply.

This embodiment provides a power supply parallel control circuit. Through the power switching module, firstly, a first switching signal is output according to the received switching control signal, and the field effect transistor Q2 of the first power supply is controlled to be turned off, thus the first power supply continuously supplies power to the load through the field effect transistor Q1 and the diode of the field effect transistor Q2. The field effect transistor of the third switch module is controlled to be turned on, and the second power supply starts to power the load. After a preset time, the power switching module outputs a second switching signal, and controls the field effect transistor Q1 of the first power supply to be turned off, so that the first power supply is disconnected from the load and stops supplying power to the load. The power switching module controls the field effect transistor of the fourth switch module to be turned on. At this time, the field effect transistor of the third switch module and the field effect transistor of the fourth switch module are both turned on. Thus, the second power supply is connected to the load, and supplies power to the load. During a process of switching the power supply of the load from the first power supply to the second power supply, by separately controlling the states of the two field effect transistors in the power supply, the power supply the power supply is maintained and no power fail happens, realizing a zero-power-failure switching of the power supply, and solves the technical problem of how to achieve zero-power-fail switching in a process of multiple power supply powering the load. In addition, in the process of switching from the first power supply to the second power supply, when the first power supply and the second power supply both supply power, due to the unidirectional conduction characteristic of the diodes in the field effect transistors, currents of the first power supply and the second power supply do not flow to each other, thus solving the technical problem that currents of multiple power supply flow to each other during power supply switching.

Third Embodiment

According to a same inventive concept, this embodiment of this application further provides a power parallel control method. As shown in FIG. 6, the power parallel control method includes:
operation S100, outputting, by a power switching module, a first switching signal according to a received switching control signal, to control a second switch module of a first power supply to conduct unidirectionally and keep supplying power to a load, and to control a third switch module of the second power supply to turn on and keep a fourth switch module to unidirectionally conduct at this time to make the second power supply to start to power the load; and
operation S200, outputting, by a switching control module, a second switching signal, after a preset time, to control the first switch module of the first power supply to be turned off and stop the first power supply from supplying power to the load, and to control the fourth switch module of the second power supply to be turned on and make the second power supply to supply power to the load.

In this embodiment, the first power supply is sequentially connected to the first switch module, the second switch module, and the load, the second power supply is sequentially connected to the third switch module, the fourth switch module, and the load, and both the first power supply and the second power supply can supply power to the load. The switching control signal can be outputted by the control module, and the switching control module is connected to the power switching module. The switching control module includes any one of a temperature detection circuit, a voltage detection circuit, a manual switching circuit and an automatic switching circuit. The temperature detection circuit can detect a working temperature of the first power supply. When the working temperature of the first power supply exceeds a preset temperature threshold, the switching control signal is output to control the power switching module to switch the power supply of the load from the first power supply to the second power supply. The voltage detection circuit can detect an output voltage of the first power supply. When the output voltage of the first power supply is lower than a preset voltage threshold, a switching control signal is output to control the power switching module to switch the power supply of the load from the first power supply to the second power supply. The temperature detection circuit or the voltage detection circuit detects the working temperature or the output voltage of the power supply that is supplying power to the load, and is not limited to the first power supply. When the working temperature of the power supply that is supplying power exceeds a preset temperature threshold or the output voltage of the power supply that is supplying power is less than a preset voltage threshold, another power supply is needed to be connected for supplying power to the load, and the temperature detection circuit or the voltage detection circuit outputs the switching control signal. In addition, the manual switching circuit can output the switching control signal according to the user's switching operation, and control the power switching module to switch the power supply of the load from the first power supply to the second power supply, and the switching operation can be an operation made by the user who determines that the switching of the power supply of the load from the first power supply to the second power supply or from the second power supply to the first power supply is needed according to an actual need. The automatic switching circuit can generate the switching control signal according to a preset period, which can be set according to the power of the power supply.

In addition, the preset time can be set according to types of the first switch module, the second switch module, the third switch module and the fourth switch module. In this embodiment, the preset time is set to be 500 ms.

In an implementation, when the first power supply supplies power to the load, firstly, the power switching module outputs the first switching signal according to the received switching control signal to control the second switch module of the first power supply to conduct in one direction to make the first power supply continuously supply power to the load and control the third switch module of the second power supply to conduct in one direction, at this time, the fourth switch module is kept to be conduct in one direction, so that the second power supply starts to power the load. After a preset time, the power switching module outputs the second switching signal to turn off the first switch module of the first power supply and stop the first power supply from supplying power to the load, and turn on the fourth switch module of the second power supply. The third switch module and the fourth switch module of the second power supply are both turned on, and the second power supply starts to supply power to the load.

This application provides a power supply parallel control method, a first switching signal is output through a power switching module according to a received switching control signal, to control a second switch module of a first power supply to conduct unidirectionally. At this time, the first switch module remains on, and the first power supply continues to supply power to the load. The third switch module of the second power supply is controlled to be turned on. At this time, the fourth switch module remains on in one direction, after a preset time, the second switching signal is output, and the first switch module of the first power supply is controlled to be turned off, so that the first power supply stops supplying power to the load, and the fourth switch module of the second power supply is controlled to be turned on. At this time, the third switch module and the fourth switch module are both turned on, and the second power supply supplies power to the load. By separately controlling the states of the two switch modules in the power supply, the power supply is always kept from power fail, and the power supply zero-power-fail switching is realized, which solves the technical problem of how to achieve zero-power-fail switching in the process of multiple power supplies to power the load, and improves the power supply switching efficiency. In a process of switching from the first power supply to the second power supply, when the first power supply and the second power supply both supply power, due to the unidirectional conduction states of the second switch module and the fourth switch module, currents of the first power supply and the second power supply do not flow to each other, thus solving the technical problem that currents of the multiple power supplies flow to each other during power supply switching.

In this embodiment, more implementation details in the specific implementation manner of the method steps can make reference to the description of the specific implementation manner of the power supply parallel control circuit in any one of the first or second embodiments. For the sake of simplicity of the specification, those details are not repeated here.

Fourth Embodiment

Based on a same inventive concept, this embodiment of this application also provides a power parallel control device. The power parallel control device includes:
 at least two sets of power supply;
 the power supply parallel control circuit described above and connected to the at least two sets of power supply.

In this embodiment, a quantity of the power supplies can be set according to an actual situation, and the power supply parallel control circuit can implement switching of any two groups of power supplies to supply power to the load. In particular, a quantity of switch modules is twice the quantity of the power supplies, at least two groups of power supplies can be respectively arranged in independent power boxes, and two switch modules are arranged in each power box.

It should be noted that, the specific structure of the power supply parallel control circuit can make reference to any one of the above-mentioned first and second embodiments Since the present embodiment adopts all the technical solutions of all the above-mentioned embodiments, it has at least all the beneficial effects brought by the technical solutions of the above-mentioned embodiments, which will not be repeated here.

The above is only the preferred embodiment of this application, and does not limit the patent scope of this application. Any equivalent structure or equivalent process transformation made by using the contents of the description and drawings of this application, or directly or indirectly applied in other relevant technical fields, are similarly included in the patent protection scope of this application.

The invention claimed is:

1. A power supply parallel control circuit comprising a power switching module, a first switch module connected to the power switching module, a second switch module connected to the power switching module, a third switch module connected to the power switching module and a fourth switch module connected to the power switching module, wherein the first switch module is further connected to a first power supply, and the second switch module is further connected to the first switch module and a load respectively, the third switch module is further connected to a second power supply, and the fourth switch module is further connected to the third switch module and the load;

wherein the power switching module is configured to output a first switching signal according to a received switching control signal, to control the second switch module to conduct unidirectionally and make the first power supply continuously supply power to the load, and to control the third switch module to be turned on, at this time, the fourth switch module is remained to be unidirectionally conductive, and the second power supply is started to supply power to the load; and
  the power switching module is further configured to output a second switching signal after a preset time, to control the first switch module to be turned off and stop the first power supply from supplying power to the load, and control the fourth switch module to be turned on to make the second power supply supply power to the load;
  wherein the first switch module comprises a field effect transistor Q1, and the second switch module comprises a field effect transistor Q2;
  wherein a gate of the field effect transistor Q1 is connected to a first driving circuit, and a source of the field effect transistor Q1 is connected to a negative electrode of the first power supply, to the gate of the field effect transistor Q1 and to an anode of a Zener diode D3 through a resistor R5, wherein a negative electrode of the Zener diode D3 is connected to the gate of the field effect transistor Q1, and wherein a drain of the field effect transistor Q1 is connected to the source of the field effect transistor Q1 through a capacitor C1, and the drain of the field effect transistor Q1 is further connected to the second switch module; and
  a gate of the field effect transistor Q2 is connected to a second driving circuit, a source of the field effect transistor Q2 is connected to a negative electrode of the load, and the source is further connected to the gate of the field effect transistor Q2 through a resistor R6 and further to an anode of a zener diode D4, and wherein a cathode of the zener diode D4 is connected to the gate of the field effect transistor Q2, a positive electrode of the load is connected to a positive electrode of the first power supply, a drain of the field effect transistor Q2 is connected to the source of the field effect transistor Q2 through a capacitor C2, and the drain of the field effect transistor Q2 is further connected to the drain of the field effect transistor Q1.

2. The power supply parallel control circuit according to claim 1, wherein the power switching module comprises:
  a micro-control unit configured to output the first switching signal according to the switching control signal, and output a second switching signal after the preset time;
  a first driving unit connected with the micro-control unit, the first switch module and the second switch module, and configured to control the second switch module to conduct unidirectionally according to the first switching signal, and control the first switch module to be turned off according to the second switching signal; and
  a second driving unit connected to the micro-control unit, the third switch module and the fourth switch module, and configured to control the third switch module to be turned on according to the first switching signal, and control the fourth switch module to be turned on according to the second switching signal.

3. The parallel power supply control circuit according to claim 2, wherein each of the first driving circuit and the second driving circuit comprises any one of an optocoupler, a driver, a field effect transistor and a triode.

4. The power supply parallel control circuit according to claim 3, wherein the first driving circuit comprises an optocoupler U1;
  wherein a first pin of the optocoupler U1 is connected to the micro-control unit through a resistor R1, a second pin of the optocoupler U1 is grounded, a third pin of the optocoupler U1 is connected to an anode of a diode D1, and a fourth pin of the optocoupler U1 is connected to the first power supply, and wherein a cathode of the diode D1 is connected to the first switch module through a resistor R3.

* * * * *